United States Patent
Mullen et al.

(10) Patent No.: US 8,626,209 B1
(45) Date of Patent: Jan. 7, 2014

(54) SYSTEMS AND METHODS FOR FORWARDING MESSAGING SERVICE MESSAGES

(75) Inventors: Christopher Michael Mullen, Easton, PA (US); Eugene Carucci, Oxford, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 449 days.

(21) Appl. No.: 12/493,795

(22) Filed: Jun. 29, 2009

(51) Int. Cl.
*H04W 4/00* (2009.01)

(52) U.S. Cl.
USPC ........ 455/466; 455/417; 455/414.4; 455/458; 455/445; 455/456.1

(58) Field of Classification Search
None
See application file for complete search history.

(56) References Cited

U.S. PATENT DOCUMENTS

| | | | |
|---|---|---|---|
| 5,946,630 | A | 8/1999 | Willars et al. |
| 6,208,870 | B1 | 3/2001 | Lorello et al. |
| 6,263,212 | B1 | 7/2001 | Ross et al. |
| 7,181,217 | B2 | 2/2007 | Kalavade |
| 7,272,634 | B2 * | 9/2007 | Clement et al. ............... 709/206 |
| 7,319,880 | B2 | 1/2008 | Sin |
| 7,730,163 | B2 * | 6/2010 | Yoshimura et al. ........... 709/219 |
| 7,941,129 | B2 * | 5/2011 | Hursey et al. .............. 455/414.4 |
| 8,014,402 | B2 * | 9/2011 | Harris ........................... 370/392 |
| 2005/0114533 | A1 * | 5/2005 | Hullfish et al. ............... 709/230 |
| 2007/0202897 | A1 | 8/2007 | Smith |
| 2008/0313288 | A1 | 12/2008 | Smith et al. |
| 2009/0253445 | A1 * | 10/2009 | Bettis et al. ................... 455/466 |

OTHER PUBLICATIONS

Maxis Personal Mobile Services—Message Plus, http://www.maxis.com.my/personal/mobile/messageplus/index_messagepl..., downloaded Mar. 11, 2009.

Maxis Personal—Terms and Conditions, http://www.maxis.com.my/personal/general/tnc_MessagePlus.asp, downloaded Mar. 11, 2009.

NewNet SMserver™ Wireless Short Message Service Tutorial, ADC® Telecommunications, 1999.

SMS Forwarder User Guide, Wireless Labs Technologies, 2006-2008.

Wireless Labs Technologies, http://www.wireless-labs.com/smsforwarder/, downloaded Mar. 11, 2009.

WirelessMoves: SMS Forwarding, http://mobilesociety.typepad.com/mobile_life/2009/02/sms-forwarding.html, downloaded Mar. 11, 2009.

* cited by examiner

*Primary Examiner* — Willie J Daniel, Jr.

(57) ABSTRACT

Systems, methods, and an article of manufacture for forwarding messaging service messages within a mobile communications network are shown and described. In some instances, upon receipt of a messaging service message a network element responds with a different destination for the received message and a command to resolve the location of the different destination. The resolution may occur by a network element that is different from the receiving network element.

23 Claims, 5 Drawing Sheets

SYSTEMS AND METHODS FOR FORWARDING MESSAGING SERVICE MESSAGES

TECHNICAL FIELD

The present subject matter relates to techniques and equipment for communications systems. In more detail, it relates to techniques and equipment for forwarding messaging service messages.

BACKGROUND

Although the ability to forward voice calls originating from or terminating on a mobile communications network has existed for years, the ability to forward other types of messages (e.g., messaging service messages) has lagged behind.

Figure 1:
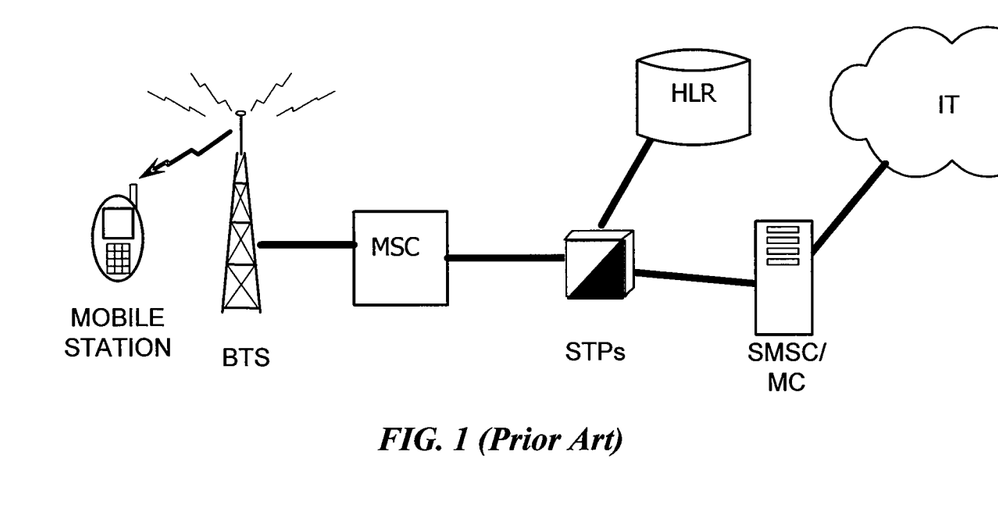
FIG. 1 is a functional block diagram that describes a various components of a mobile network used to implement a known SMS message service.

FIG. 1 depicts a block diagram of a number of wireless network components that are used to implement short messaging service (SMS) messaging. Wireless carriers developed SMS to transmit text messages for display on the mobile stations. In many existing network architectures, the SMS traffic uses the signaling portion of the network, through routers referred to as Signaling Transfer Points (STPs). SMS traffic normally goes to/from a SMSC (Short Message Service Center) which is one type of Message Center (MC). The STPs provide communications between the SMSCs and the mobile switching center (MSC) as well as between the SMSCs and the Home Location Register (HLR).

A mobile station registers with the network, and the network authenticates the mobile station, e.g. to check that the mobile station has a valid device number—mobile identification number (MIN) or international mobile subscriber identity (IMSI). In a typical implementation, the mobile station attempts to register with an MSC through a base transceiver station (BTS), and in response, the MSC communicates through an appropriate STP with the HLR that maintains the record for the respective mobile station, to authenticate the mobile station. At that time, the MSC will also assign a visitor location register (VLR) to the mobile station and temporarily store service profile information for that station in the assigned VLR. The signaling communication between the MSC and the HLR enables the HLR to update the stored location information for the respective mobile station in the associated profile record to indicate the mobile station's current point of attachment to the network, for use in directing subsequent incoming voice or SMS calls to the mobile station through the MSC that is currently serving that particular mobile station.

If the mobile station roams, the mobile station from time to time will re-register in a similar fashion, but through different MSCs. Each registration signaling communication enables the HLR to update the stored location information for the respective mobile station in the associated profile record, to reflect the current point of attachment of the mobile station to the network. The stored information indicates the MSC at which the client most recently registered. Routing of an inbound SMS message to the mobile station, for example, involves a communication between the SMSC and the HLR to obtain the current location information for the respective mobile station client, similar to that for an in-bound voice call to the mobile station. For communications with a service provider, e.g., the provider's application server, the message may use a short code assigned to the service provider.

An SMS message includes source and destination address fields. For messages from a user device, the source address is the mobile directory number (MDN) of the sending customer's mobile station. The destination address may be a MDN of a destination station or some other form of recognizable address. The network routes a SMS message with a MDN destination address all the way through to the addressed mobile station. Routing among the network components can occur using the MINs associated with each respective MDN.

For SMS messages originating at a mobile station, the MSC determines where to route the message, typically to one of several SMSCs deployed in the network. The MSC makes that determination based on the MIN of the sending device. Essentially, the MSC looks up the point code or other form of address for the appropriate SMSC based on the MIN of the sending mobile station contained in the received SMS message.

As discussed above, the destination address of a SMS message usually contains a directory number or other full address of the destination, or the destination address field contains a predefined short code. In a normal operation for a SMS transmission to a mobile station, an SMSC receives the message containing the MDN of the destination station and queries the particular HLR that stores the record associated with that station's MDN for information about the mobile station that is needed to route the message to the mobile station at its current location. The HLR responds by providing the routing information, typically the MIN of the mobile station and a SS7 point code or other form of address for the MSC where the mobile station was last registered. The SMSC uses the information to signal the MSC that last registered the mobile station (based on the point code or other form of address of the MSC), and the MSC uses the MIN to page the mobile station.

As users demand more and more methods of enabling communication depending on their location and schedule combined with the increase reliance on messaging service messages as a form of communication, it appears the need to forward these types of messages to a forwarding destination exists. With the above as a backdrop, U.S. Pat. No. 7,319,880 describes one method for forwarding SMS messages. In this patent, one configuration described with reference to FIG. 4 of the U.S. Pat. No. 7,319,880 shows an "on network" forwarding system among mobile terminals. Another configuration described with reference to FIG. 5 of the patent shows an "off network" forwarding system. (i.e., the destination of the forwarded to mobile terminal is on a network different from the originating mobile terminal). In yet another configuration, the forwarded message terminates to a public switched telephone network (PSTN) destination. As such, the text message is converted to voice and played to the end user. The systems and methods of U.S. Pat. No. 7,319,880 have several short comings for today's messaging needs. The disclosure appears to be limited to SMS type messages. As the number of EMS and MMS messages increase, a need exists to forward these types of messages as well.

Also, it appears the MCs are at the center of resolving the location of the forwarding destination in the above-references. As the number of messaging service messages carried by mobile communications networks continues to increase, the burden placed on the MCs also increases. This also decreases the MCs ability to provide other services. In addition, it appears that either forwarding is on or off in the above-reference patent application. Thus, either all SMS messages are forwarded or none are forwarded. User's may desire to forward only messages based on certain criteria.

Thus, a need exists for allowing end-user to forward messaging service messages to many types of destinations. Further, refinement of which messages are forwarded is also needed.

SUMMARY

The teachings herein alleviate one or more of the above noted problems with the known methods for forwarding SMS messages.

The equipment and techniques described herein provide the ability to forward messaging service messages (e.g., SMS, enhanced messaging service (EMS), multi-media messaging service (MMS), etc.) to a new destination (e.g., another mobile station number, email address, PSTN number, and others). In some instances, when, an SMS request comes into the internal or external HLR, the HLR will responds with a unique cause code and forwarding MDN. A new cause code is built into the HLR that allows the HLR to respond with the appropriate cause code and forwarding MDN when call forwarding is activated. The cause code and forwarding MDN are provided to another network element (e.g., a wireless internet gateway (WIG), broadband messaging gateway (BMGW), or simple messaging service point-to-point (SMPP) gateway), that in turn resolves the location of the forwarding MDN. In some cases, the ability to differentiate voice call forwarding from messaging forwarding can be controlled via codes or an HLR data fill (e.g., a web interface).

In one instance, the present disclosure is directed to a method of forwarding a messaging service message. The method includes receiving a messaging service message destined for a mobile station and issuing a request to resolve the location of the mobile station. The method also includes receiving a command, responsive to the request, to forward the received messaging service message and an identification of a forwarding destination associated with the mobile station, when message forwarding is enabled for the mobile station. The method also includes, issuing a request to a second network element to resolve the location of the forwarding destination and forwarding the received message through the mobile communications network to the resolved forwarding destination.

Resolving the forwarding destination address can include, but is not limited to, determining the actual location of the forwarding destination, determining an intermediate location to send the messaging service message too, determining whether to send the message to another network element for further processing, determining whether the forwarding destination resides on-network or off-network, and other forms. For example, resolution of a forwarding destination can occur by determining the forwarding destination is a mobile station on a second mobile network and sending the message from a network device on a first mobile network to a network device on a second mobile network. In addition, resolving can include determining an Internet location (i.e., an IP address) to forward the messaging service message too. Of course, other forms of resolution are contemplated.

In another instance, the disclosure is directed to a mobile communications network. The network includes a traffic network and one or more mobile communications network elements in communication with the traffic network. The traffic network supports communications. The one or more mobile communications network elements are configured to receive a messaging service message destined for a mobile station, issue a request to resolve the location of the mobile station, and upon message forwarding being set with respect to the mobile station, receive a command responsive to the request to forward the received messaging service message and an identified forwarding destination associated with the mobile station. The network elements are also configured to issue a request to another network element to resolve the location of the forwarding destination and forward the received message through the mobile communications network to the forwarding destination.

Other concepts relate to unique software for implementing forward of a messaging service message. A software product, in accord with this concept, includes at least one machine readable medium and information carried by the medium. The information carried by the medium may be executable program code.

In yet another instance, the disclosure is directed to an article of manufacture. The article includes a machine readable storage medium and executable program instructions embodied in the machine readable storage medium. Execution of the instructions by a programmable system coupled to a mobile communications network cause the system to perform functions that forward a messaging service message. The functions include receiving a messaging service message destined for a mobile station, issuing a request to resolve the location of the mobile station, and upon message forwarding being set with respect to the mobile station, receiving a command responsive to the request to forward the received messaging service message and an identified forwarding destination associated with the mobile station. The functions also include issuing a request to another network element to resolve the location of the forwarding destination and forwarding the received message through the mobile communications network to the forwarding destination.

In some cases, the messaging service messages can include, but are not limited to, short messaging service messages, enhanced messaging service messages, and multimedia messaging service messages. The forwarding destination can include one or more mobile stations on the same network or on a different network, one or more email addresses, or one or more PSTN destinations.

Various network communications elements can perform one or more of the actions described herein. For example, an HLR can resolve the location of the mobile and a WIG, BMGW or SMPP gateway can resolve the location of the forwarding destination.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to forwarding messaging service messages originally destined for one mobile station to another destination. In order to forward the messages, the end-user enables and disables the forwarding feature. For example, the end user of the mobile station can enter a specific code and input a forwarding destination to which the incoming messaging service messages are delivered. The end user may also input the forwarding destination through other means such as a web interface associated with the mobile carrier of the mobile station. The forwarding destination can take many forms. Examples include, but are not limited to, another on-network mobile station, an off-network mobile station, an email address or a PSTN phone number. Also, various combinations of forwarding destinations can be used. After forwarding is enabled the components of the mobile network cooperate to forward messages to the appropriate forwarding destinations. Said another way, when a messaging service message destined for a mobile station associated with an end-user that has enabled the forwarding feature, the components of the mobile network cooperate to forward the message to the indicated forwarding destination. For example, the messages can be forwarded to another mobile station, an email address, a PSTN destination, an email address, or other destinations. Further details of how the network components operate to provide message forwarding are described below in more detail.

Figure 2:
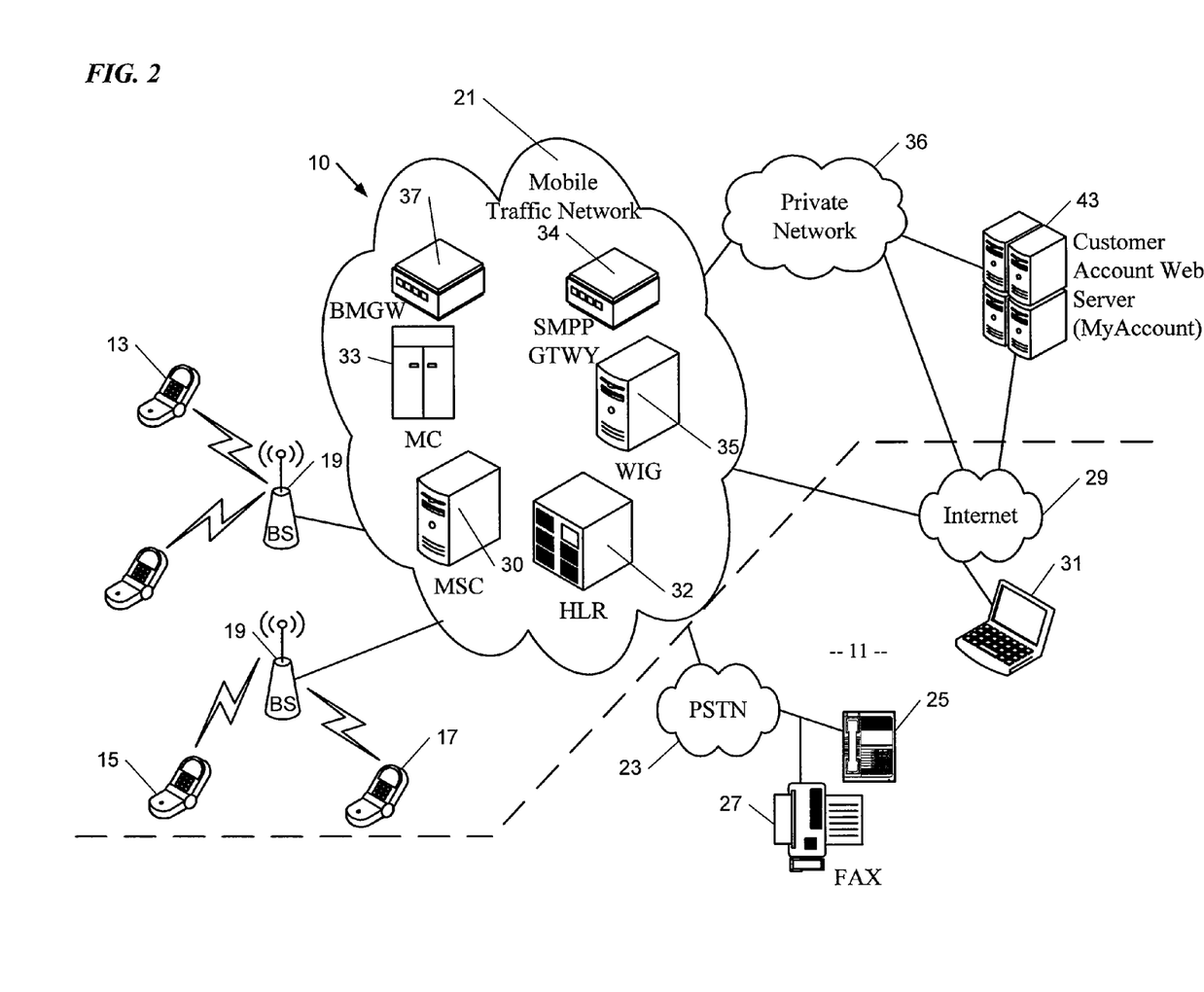
FIG. 2 is a functional block diagram useful in understanding networked elements/systems that may be used in forwarding messaging service messages.

Reference now is made in detail to the examples illustrated in the accompanying drawings and discussed below. FIG. 2 illustrates a number of mobile stations, a mobile communication network coupled to other communication networks and several systems/elements associated with or included in the mobile network for various functions as may be involved in forwarding messaging service messages to a user-supplied forwarding destination. Before beginning, it is helpful to understand that a Mobile Directory Number (MDN) is the telephone number assigned to a mobile station, which a calling party or device inputs in order to call or send a message to the particular mobile station. To call the mobile station, for example, a user of a PSTN telephone or of another mobile station dials the MDN associated with the mobile station. To send a MMS message or a SMS message to destination mobile station, as another example, typically entails input of the MDN of the called mobile station.

A Mobile Identification Number (MIN) is an identification number used by the network to signal a particular mobile station. The MIN is formatted like a telephone number, and the MIN may be the same as the MDN. However, increasingly, the network assigns a different number for use as the MIN and translates the MDN input by a calling or other originating party into the MIN that the network uses to establish the call or send the message to the destination mobile station. Of these numbers assigned to the mobile station, the MDN typically is the number or address of the station known and used by other parties or stations.

Hence, FIG. 2 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations 11 outside the mobile communication network 10.

For purposes of later discussion, several mobile stations appear in the drawing, to represent examples of the mobile stations that may receive various services via the mobile communication network 10. Today, mobile stations typically take the form portable handsets, laptops with air cards, smartphones or personal digital assistants, although they may be implemented in other form factors. For discussion of messaging service messaging forwarding, we will assume that the mobile stations 13, 15 and 17 and their associated MDNs are each associated with a respective carrier account.

The network 10 allows users of the mobile stations to initiate and receive telephone calls to each other as well as through the public switched telephone network (PSTN) and telephone stations connected thereto. The network 10 allows messaging service type message (e.g., SMS type text messages, EMS type messages, and MMS type messages) to be routed among mobile stations and other devices via the network 10 and via the Internet. The network 10 typically offers a variety of other data services via the Internet, such as downloads, web browsing, e-mail, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, 15 and 17, will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, 15 and 17, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 and 17 between the base stations and other elements with or through which the mobile stations communicate. In some examples, the mobile traffic network includes network elements such as mobile switching centers (MSCs) 30, message centers (MCs) 33, home location registries (HLRs) 32, and other network elements such as wireless internet gateways (WIGs) 35, broadband wireless gateways (BMGW) 37 and visitor location registers (VLRs) (not shown). Other individual elements such as switches and/or routers forming the traffic network 21 are omitted here form simplicity. Various combinations of the network elements cooperate to provide the various messaging service message forwarding capabilities discussed herein. It is understood that the various network elements can communicate with each other and other aspects of the mobile communications network 10 and networks (e.g., PSTN and Internet) either directly or indirectly.

The mobile switching center (MSC) 30 is responsible for managing communications between the mobile station and the other elements of the network 10. In addition, the MSC 30 is responsible for handling voice calls and messaging service message requests as well as other services (such as conference calls, FAX and circuit switched data). The MSC 30 sets up and releases the end-to-end connection, handles mobility and hand-over requirements during the call. The MSC 30 is sometimes referred to as a "switch". The MSC 30 manages the cell sites, the voice trunks, voicemail, and SS7 links.

The message center (MC) 33, in some examples, allows messaging service messages to be exchanged between mobile telephones and other networks. For SMS messaging, for example, the MC 33 receives packet communications containing text messages and forwards the messages via the signaling resources and the signaling channels to the appropriate mobile stations. The MC 33 will also receive similar messages from the mobile devices and forward them to servers or terminal devices accessible via an Internet Protocol (IP) packet data network. For example, the MC 33 may supply an SMS message to a Wireless Internet Gateway (WIG) 35 that is in communication with the Internet and can communicate with devices terminating on the Internet 29.

In some examples, the MC 33 can also be considered or include functionality that may be considered that of a Short Messaging Service Message Center (SMSC) or a Message Register (MR). Wireless carriers developed the short message service (SMS) to transmit text messages for display on the mobile stations. In many existing network architectures, the SMS traffic uses the signaling portion of the network 21 to carry message traffic between a Short Message Service Center (SMSC) 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway 34 provides protocol conversions, between SMPP as used by the SMSC 33 and the protocols used on the Internet 29 or other IP network. SMPP messages ride on IP transport, e.g. between the gateway 34 and the SMSC 33.

In other examples, the MC 33 can include functionality related to the Enhanced Messaging Service (EMS) or Multimedia Messaging service (MMS). An EMS message can have special text formatting (such as bold or italic), animations, pictures, icons, sound effects and special ring tones. MMS messages support the sending and receiving of multimedia messages (e.g., images, audio, video and their combinations) to (or from) MMS-enabled mobile stations. In some examples, the MC 33 can be considered in whole or in part a multimedia messaging service center (MMSC).

Although a single MC 33 is shown, a network 10 will often have many geographically dispersed MCs 33. The MCs 33 can include destination routing tables (DRTs). In essence the DRTs are databases within the MCs 33. A DRT contains a list of the MDNs which are associated with the various MCs 33. For example, a first MDN is associated with a MC 33 in Minnesota while a second MDN is associated with a MC 33 in Virginia. The DRTs are used to determine which MC 33 should attempt to deliver an incoming messaging service message to the destination MDN. For example, if a user associated with the MC in Minnesota sends an SMS to a user associated with the MC 33 in Virginia, the Minnesota MC 33 sends the SMS to the Virginia MC 33 for delivery to the destination MDN. The communication among the MCs 33 occurs using known protocols such SMPP and the like.

The HLR 32, in some examples, stores a subscriber profile for each of the wireless subscribers and their associated mobile stations 13, 15, and 17. The HLR 32 may reside in an MSC 30 or in a centralized service control point that communicates with the MSC(s) 34 via an out-of-band signaling system such as an SS7 network. The HLR 32 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 32 can also be a stand-alone device. The HLR also tracks the current point of attachment of the mobile station to the network, e.g., the identification of the MSC 30 with which the mobile station is currently registered to receive service.

The visitor location register (VLR) (not shown) is, in some examples, a temporary database of the mobile stations that have roamed into the particular area which it serves. The VLRs for a region often are implemented in or in association with a MSC 30. Each base station 19 in the network is served by a single VLR, hence a subscriber cannot be present in more than one VLR at a time. The data stored in the VLR has either been received from the HLR 32, or collected from the mobile station.

The SMPP gateway 34 provides functionality to transport messaging service messages to other mobile communication networks and also receive messaging service messages from other networks. The SMPP gateway 34 supports communications using the SMPP protocol. SMPP gateways 34 are Short Message Peer-to-Peer (SMPP) gateways 34 used to connect the wireless communication network (such as an Internal Protocol IP network on the left of the Gateway) to another network (such as a public Internet network on the right of the Gateway). The SMPP Gateway 34 allows the MC 33 to receive and send messages in IP packet format. The SMPP Gateway 34 is an entity within the wireless network 10 that acts as an intermediary between the wireless service provider network and other networks. For example, the SMPP Gateway 34 converts messages in protocol(s) used by other applications and devices, e.g. Extensible Markup Language (XML), Hypertext Mail Protocol (HTMP), etc., to and from the SMPP protocol. The SMPP messages ride on IP transport, e.g. between the SMPP Gateway 34 and the MC 33.

The wireless internet gateway (WIG) 35 provides functionality that allows the WIG 35 to send messages to any number of peer gateways on the Internet 29. Thus, the WIG 35 can send message forwarded to email address to the appropriate network elements registered on the Internet 29. In some examples, the WIG 35 can also facilitate communications across different types of mobile communication networks, either through the Internet 29 or directly to the other mobile communications networks, similar to the functionality of the SMPP Gateway 34. For example, the WIG 35 provides the ability of a mobile station connected to a GSM network to send messaging service message to a mobile station on a CDMA type mobile communication network. The WIG 35 can communicate with the gateways of other carriers (particularly other wireless carriers) having different and occasionally changing kinds of message destinations using different and occasionally changing protocols.

The broadband messaging gateway (BMGW) 37 provides functionality that allows the BMGW 37 to send messages to any number of peer gateway on the Internet 29. Typically, the BMGW is used in a network 10 that provides Evolution-Data Optimized (EV-DO) or Long Term Evolution (LTE) type services. The BMGW 37 is a gateway that provides access to a packet date serving node (PDSN) (not shown). The BMGW 37 provides functionality similar to the WIG and the SMDPP GW but for the EV-DO and LET type networks. Thus, the BMGW 37 can send message forwarded to email address to the appropriate network elements registered on the Internet 29. In some examples, the BMGW 37 can also facilitate communications across different types of mobile communication networks, either through the Internet 29 or directly to the other mobile communications networks, similar to the functionality of the SMPP Gateway 34. For example, the BMGW 37 provides the ability of a mobile station connected to a GSM network to send messaging service message to a mobile station on a CDMA type mobile communication network. The BMGW 37 can communicate with the gateways of other carriers (particularly other wireless carriers) having different and occasionally changing kinds of message destinations using different and occasionally changing protocols.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25. For purposes of discussing message forwarding some messages may be converted to voice and be forwarded to a regular telephone 25 via the PSTN 23. The PSTN 23 also provides connections to other types of customer premises equipment, such as facsimile or 'FAX' machines. The drawing shows one FAX machine 27, by way of example, to illustrate the point that messages may be forwarded to a FAX machine, such as the machine 27. The message forwarding described herein also enables various messaging service messages to be forwarded to devices associated with the PSTN. For example, an SMS message can be forwarded to a FAX machine 27 for printing. Also, the SMS message can be converted using a computing device to an audible representation of the SMS and communicated via a traditional telephone to an end-user of the telephone 25.

The traffic network portion 21 of the mobile communication network 10 connects to a public packet switched data communication network, such as the network commonly referred to as the "Internet" shown at 29. In some configurations, the WIG 35 and/or the BMGW 37 provides an interface between the traffic network portion 21 of the network 10 and the Internet 29. Packet switched communications via the traffic network 21 and the Internet 29 may support a variety of user services through the network 10, such as mobile station communications of text and multimedia messages, e-mail, web surfing or browsing, programming and media downloading, etc. For example, the mobile stations may be able to receive messages from and forward messaging service messages to user terminal devices, such as personal computers, either directly (peer-to-peer) or via various servers (not separately shown). The drawing shows one such user terminal device as a personal computer (PC) at 31, by way of example. For purposes of discussing message forwarding, a messaging service message may use an e-mail address as a forwarding destination. As such, the forwarded messages can be retrieved from a PC 31 via the Internet 29.

In practice today, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount' (Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29. Of note for purposes of the present discussions of messaging service messaging, the web site provides secure user access to the forwarding functions and allows the subscriber to designate a forwarding destination incoming messaging service messages and activate and cancel such forwarding.

For example, the subscriber may use the PC 31 to log-in via the site offered by the server 43 and enable, cancel, or change parameters associated with message forwarding. The web site allows the subscriber to enter one or more forwarding destinations for messaging service messages. In some instances, each respective type of messaging service message is forwarded to a different destination. For example, SMS messages can be forwarded to another mobile station, while EMS messages can be forwarded to a first e-mail address and MMS messages forwarded to a second e-mail address. Of course, various combinations of the previous example are possible. For example, the end-user can configure message forwarding to apply only to SMS messages and can include multiple forwarding destinations (e.g., another mobile station, an e-mail address, and a PSTN telephone number). The server 43 communicates with other network systems via the private network 36, for example, to store the forwarding information in the HLR 32. Various protocols can be used to communicating the forwarding information to the HLR 32. For example, XML over HTTP, TCP over IP, or SS7 signaling can be used.

With that overview of the system, it may be helpful now to consider a high-level discussion of an example of how messaging service message forwarding operates within the system including how these services might appear from the user or subscriber's point of view. Certain features of the present disclosure are activated by the control of the end-user of a mobile station. That is, the end-user chooses to enable and disable messaging service message forwarding. These features can be enabled, in some examples, from the mobile station using a specific star or pound code (e.g., *65 or #65) and then inputting a forwarding destination using the MS. Again, the forwarding destination can be another MDN, an email address, a PSTN telephone, or various combinations of these destinations. To deactivate the features, another star or pound code (e.g., *66 or #66) inputted through the mobile station can be used.

Message forwarding can also be activated, deactivated, or modified through the aid of a customer service representative. For example, the end-user of the mobile station can use a star or pound code to reach the customer service representative. The end-user informs the representative to active or deactivate message forwarding. When activating the feature, the end-user also provides one or more forwarding destinations to the customer service representative.

Also, the feature can be activated, deactivated, or modified using a web interface provide by the customer account web server 43. As discussed above, the end-user accesses their account settings through this interface. The end-user is provided with a check box or other means to enable message forwarding. As part of the activation process, the end-user inputs one or more forwarding destinations for incoming messaging service messages.

The end-user can also selectively enable forwarding for a select set of messages based on parameters of the message. For example, the end-user can choose to forward messages during certain times of the day. Also, the end-user can impose a time limit on the forwarding thus alleviating the need to access their account a second time to disable the message forwarding. In addition to temporal filtering, selective forwarding can be based on the type of incoming message (e.g., SMS, EMS, MMS) or the originator of the message. For example, the end-user can configure forwarding to apply only to SMS messages. Also, the end-user can configure the system to only forward messaging service messages from one or more specific originating sources (e.g., MDNs, email addresses, short codes, etc.). Of course, various combinations can be used. For example, the end-user can configure forwarding of SMS messages from a specific originating MDN between the hours of 9 AM and 6 PM.

Once the end-user enables messaging forwarding and configures any filtering, these service changes need to be communicated to the various network components. For example, if the web interface is used to enable message forwarding then the customer account web server 43 communicates the forwarding parameters to the HLR 32 the MDN of the end-user is registered with. Again, any of a number of protocols can be used to convey the information to the HLR from the customer account web server 43. Examples include, but are not limited too, XML over HTTP, HTML over HTTP, SMPP, and the like.

The HLR 32 is updated to indicate that messaging forwarding for the particular MDN is enabled. Thus, when a new incoming messaging service message originally destined for the end-user's MDN, it is forwarded to the appropriate destination. Functionality in the HLR 32 allows the HLR 32 to respond to an incoming SMS request with a unique cause code and forwarding destination (e.g., forwarding MDN). The MC 33 receives the cause code and forwarding destination. In response, the MC provides additional forwarding functionality such as forwarding the original message to a WIG 35, BMGW 37, or SMPP Gateway 34 along with the forwarding destination for resolution and delivery.

Figure 3:
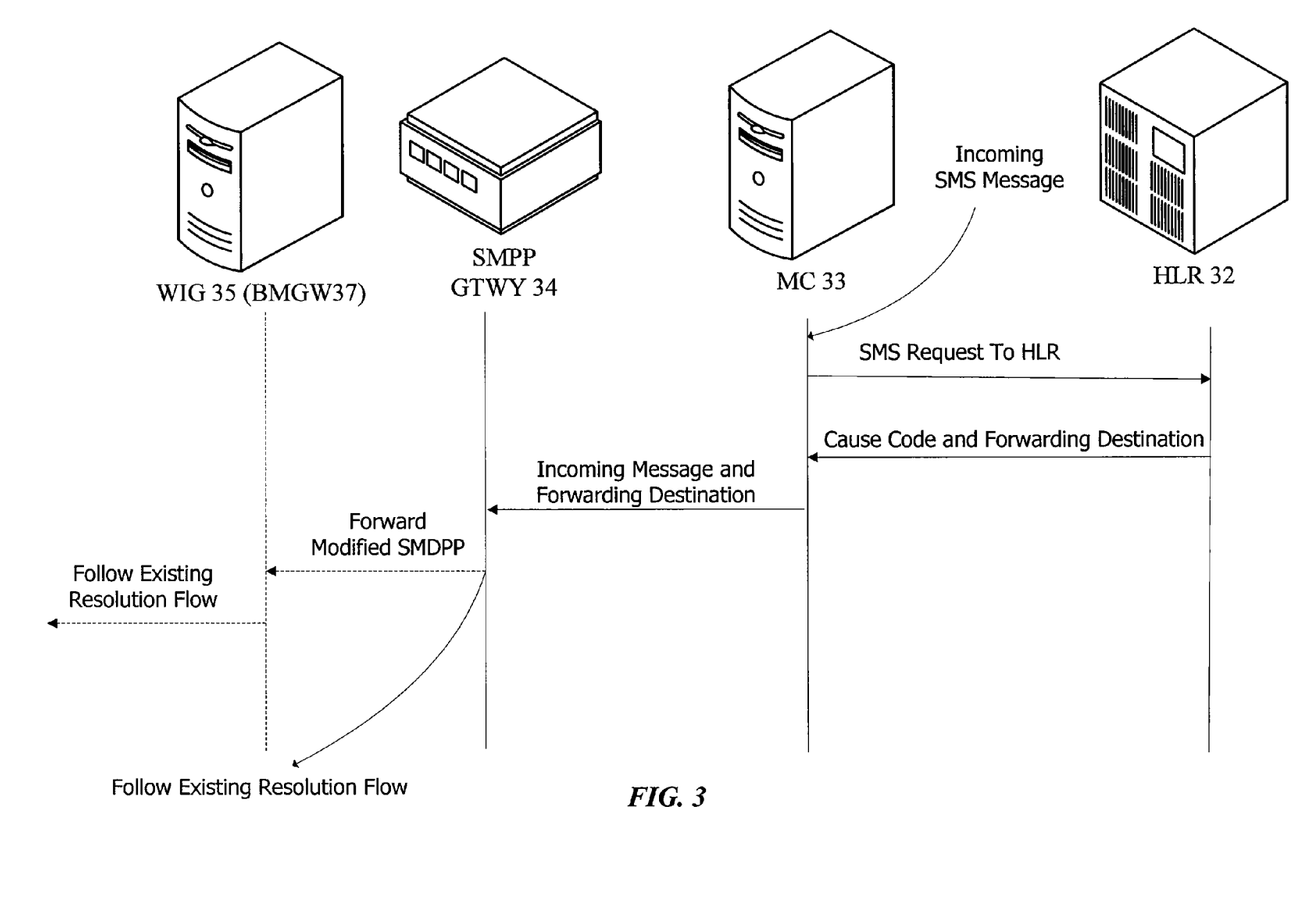
FIG. 3 is a call flow diagram useful in understanding one example of message forwarding.

A call flow and method showing the operation of various components of the network 10 after message forwarding is enabled is shown and described with reference to FIG. 3. As previously described, a messaging service message is received by the MC 33, for example from an MSC 30 when originated by another mobile station as previously described. The incoming message is destined for an MDN associated with the carrier operating the network 10. The MC 33 sends an SMSREQ message to the HLR 32 that stores the records for the destination MDN associated with the incoming message. The SMSREQ can be thought of as a request for information about the mobile station that is needed to route the message to the mobile station at its current location. In a traditional SMS application, the HLR 32 would respond with the routing information, typically the MIN of the mobile station and a SS7 point code or other form of address for the MSC where the mobile station was last registered. However according to features of the messaging service message forwarding described herein, in response to the SMSREQ the HLR 32 determines that message forwarding is set for the particular MDN. If forwarding is enabled, the HLR 32 also uses the parameters included as part of the incoming SMS and applies any filtering that was previously described.

When forwarding is set and the message is to be forwarded, the HLR 32 responds with a cause code and one or more forwarding destinations that were indicated by the end-user. For purposes of this first example, the cause code indicates that the MC should forward the message to the SMPP gateway 34. One reason to send the message to the SMPP gateway 34 is because the SMPP gateway 34 can send messages off the network 10. That is, if the forwarding MDN is associated with another wireless carrier the SMPP gateway 34 can resolve those destinations and forward the message accordingly. Recall that the SMPP gateway 34 provides the ability of a mobile station connected to a GSM network to send an messaging service message to a mobile station on a CDMA type mobile communication network.

Resolving the forwarding destination address can include, but is not limited to, determining the actual location of the forwarding destination, determining an intermediate location to send the messaging service message too, determining whether to send the message to another network element for further processing, determining whether the forwarding destination resides on-network or off-network, and other forms. For example, resolution of a forwarding destination can occur by determining the forwarding destination is a mobile station on a second mobile network and sending the message from a network device on a first mobile network to a network device on a second mobile network. In addition, resolving can include determining an Internet location (i.e., an IP address) to forward the messaging service message too. Of course, other forms of resolution are contemplated.

Communication between the MC and the HLR 32 occur using the short message peer-to-peer (SMPP) protocol, which is an SS7 type protocol for cellular networks. In essence, the SMPP protocol is a signaling protocol. Of course, other communications protocols can be used.

The MC 33 receives the response from the HLR 32 including the cause code that indicated forwarding is enabled and thus the incoming message should be delivered to the forwarding destination received from the HLR 32. The cause code indicates that incoming messages should be forwarded to the SMPP gateway 34 for further resolution, but the destination of the incoming message is replaced. Said another way, the original destination MDN is replaced with the forwarding destination. The contents of the message are not replaced though, thus the original communication is left intact. In detail, the incoming SMS Delivery Point-to-Point (SMDPP) is modified to replace the original destination MDN with the forwarding destination. An SMDPP is an SS7 message that includes the bearer data. The SMDPP includes the actual text message, the originating MDN (i.e., the sender's MDN), MIN and terminating MDN (i.e., the receiver's MDN). It is this terminating MDN that is replaced with the one or more forwarding destinations. The modified SMDPP is communicated to the SMPP gateway 34 for further resolution and delivery. Again, the communication between the SMPP gateway 34 and MC 33 occurs using SMPP, although other protocols can also be used.

The SMPP gateway 34 treats the SMDPP message as if is was received from another wireless network. Thus, it resolves the forwarding destination address and delivers the SMDPP to the destination according to known principles. Complete details of this process are considered to be understood by a skilled artisan and thus are omitted for clarity purposes.

In some cases, the SMPP gateway 34 determines that the destination is not one that the SMPP gateway 34 can reach without aid from the WIG 35 (e.g., certain email addresses) or the BMGW 37. As such, the SMPP gateway forwards the modified SMDPP to the WIG 35 or the BMGW 37.

The WIG 35 or BMGW 37 performs its known resolution procedures and delivers the modified SMDPP to the appropriate forwarding destination. In some instances, the WIG 35 or BMGW 37 communicates and interacts with other gateways to ensure the incoming messaging service message is forwarded to the forwarding destination. For example, if a PSTN number is the forwarding destination the data (e.g., text data) needs to be converted to audible content. Thus, the WIG 35 or BMGW 37 can include or communicate with components to provide this functionality. The converted data is delivered to the PSTN number via a PSTN exchange (not shown) that is in communication with the WIG 35 or BMGW 37.

Figure 4:
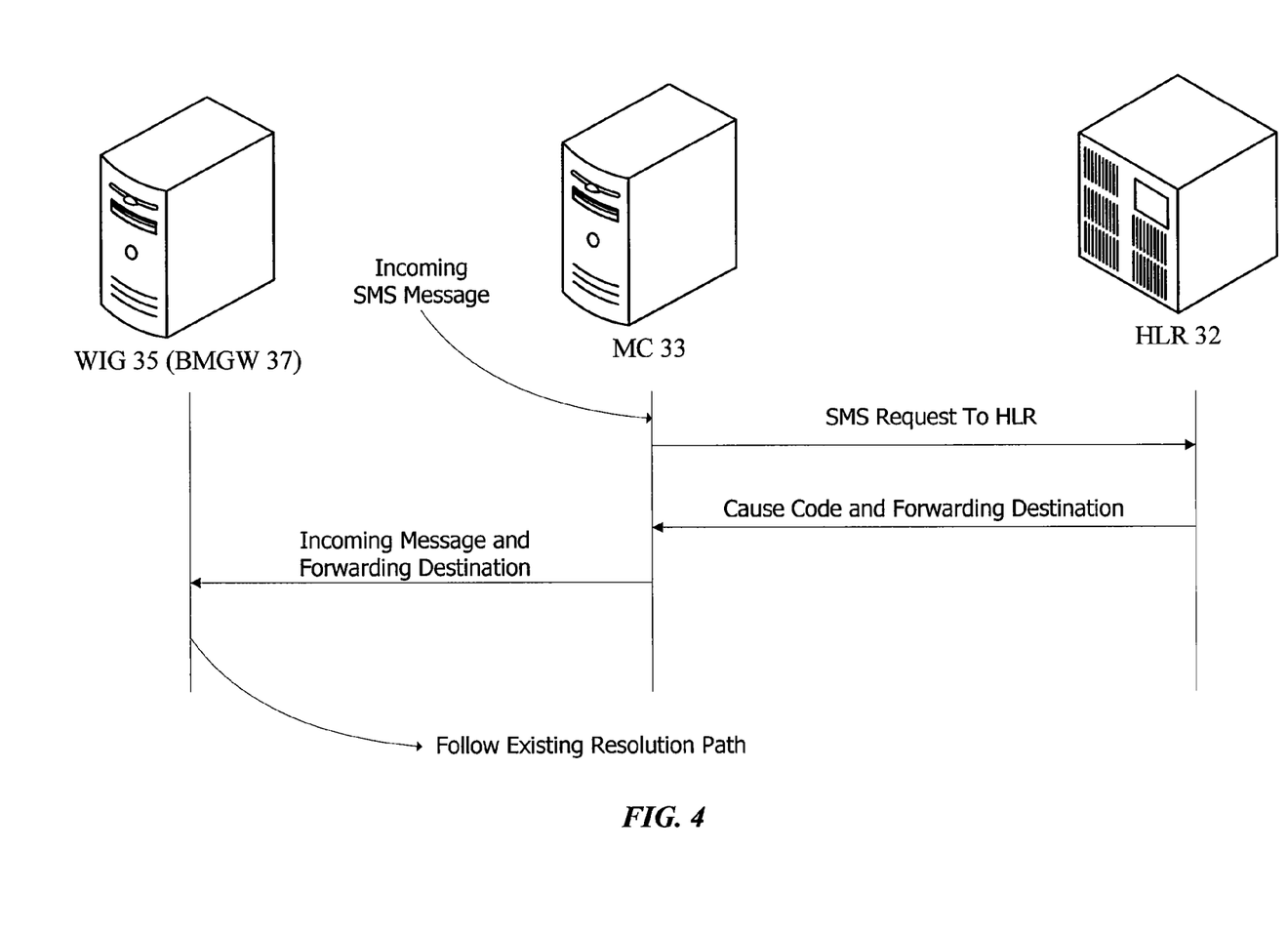
FIG. 4 is a call flow diagram useful in understanding another example of message forwarding.

In FIG. 4, another scenario for message forwarding is shown and described. FIG. 4 also shows a call flow and method for forwarding messaging service messages. When compared with FIG. 3, the SMPP gateway 34 is removed. In FIG. 4, the WIG 35 or BMGW 37 provides the off-network communication functionality. In FIG. 4, a messaging service message is received by the MC 33 typically from an MSC 30 as previously described. The incoming message is destined for an MDN associated with the carrier operating the network 10. The MC 33 sends an SMSREQ message to the HLR 32 that stores the records for the destination MDN associated with the incoming message. The SMSREQ can be thought of a request for information about the mobile station that is needed to route the message to the mobile station at its current location. In a traditional SMS application, the HLR 32 would respond with the routing information, typically the MIN of the mobile station and a SS7 point code or other form of address for the MSC where the mobile station was last registered. However according to features of the messaging service message forwarding described herein, in response to the SMSREQ the HLR 32 determines that message forwarding is set for the particular MDN. If forwarding is enabled, the HLR 32 also uses the parameters included as part of the incoming SMS and applies any filtering to determine whether to forward the message.

When forwarding is set, the HLR 32 responds with a cause code and one or more forwarding destinations that were indicated by the end-user. The cause code indicates that the MC should issue a request to the WIG 35 or BMGW 37. One reason to send the message to the WIG 35 is because the WIG 35 can send messages off the network 10. That is, if the forwarding MDN is associated with another wireless carrier or email address the WIG 35 BMGW 37 can resolve those destinations and forward the message accordingly. Recall that the WIG 35 and the BMGW 37 provide the ability of a mobile station connected to a GSM network to send an messaging service message to a mobile station on a CDMA type mobile communication network. The WIG 35 and BMGW 37 can communicate with the gateways of other carriers (particularly other wireless carriers) having different and occasionally changing kinds of message destinations using different and occasionally changing protocols.

Again, resolving the forwarding destination address can include, but is not limited to, determining the actual location of the forwarding destination, determining an intermediate location to send the messaging service message too, determining whether to send the message to another network element for further processing, determining whether the forwarding destination resides on-network or off-network, and other forms. For example, resolution of a forwarding destination can occur by determining the forwarding destination is a mobile station on a second mobile network and sending the message from a network device on a first mobile network to a network device on a second mobile network. In addition, resolving can include determining an Internet location (i.e., an IP address) to forward the messaging service message too. Of course, other forms of resolution are contemplated.

Communication between the MC 33 and the HLR 32 occur using the short message peer-to-peer (SMPP) protocol, which is an SS7 type protocol for cellular networks. In essence, the SMPP protocol is a signaling protocol. Of course, other communications protocols can be used.

The MC 33 receives the response from the HLR 32 including the cause code that indicated forwarding is enabled and thus the incoming message should be delivered to the forwarding destination received from the HLR 32. The cause code indicates that the incoming message should be forwarded to the WIG 35 or BMGW 37, but the destination of the incoming message is replaced. Said another way, the original destination MDN is replaced with another destination. The contents of the message are not replaced though, thus the original communication is left intact. In detail, the incoming SMS Delivery Point-to-Point (SMDPP) is modified to replace the original destination MDN with the forwarding destination. It is this terminating MDN that is replaced with the one or more forwarding destinations. The modified SMDPP is communicated to the WIG 35 for further resolution and delivery. Again, the communication between the WIG 35 and MC 33 occurs using SMPP, although other protocols can also be used. In some examples, communications between the MC 33 and the BMGW 37 can occur using the session initiation protocol (SIP).

The WIG 35 or BMGW 37 treats the SMDPP as if is was received via the Internet 29 from another carrier or other destination. Thus, it resolves the forwarding destination address and delivers the SMDPP to the destination. Complete details of this process are considered to be understood by a skilled artisan and thus are omitted for clarity purposes.

In some cases, the WIG 35 or BMGW 37 communicates and interacts with other gateways to ensure the incoming messaging service message is forwarded to the forwarding destination. For example, if a PSTN number is the forwarding destination the data (e.g., text data) needs to be converted to audible content. Thus, the WIG 35 or BMGW 37 can include or communicate with components to provide this functionality. The converted data is delivered to the PSTN number via a PSTN exchange (not shown) that is in communication with the WIG 35 or BMGW 37.

The above described systems, methods, and apparatuses, may be implemented by programming and/or provisioning appropriate network elements such as the HLR 32, MC 33, SMPP gateway 34, and/or the WIG. 35. In some examples, the cause code mentioned above is provisioned into the HLRs 32. Also, an appropriate response to the cause code is programmed into the MCs 33. Thus when the HLR 32 issues the cause code the MC 33, the MC 33 forwards the incoming messaging service message along with the one or more forwarding destinations to the SMPP gateway 34 and/or WIG 35 and/or BMGW 37. These components treat the messages as any other messaging service message and implement their known delivery mechanism and methods. Using the described techniques, forwarding of SMS, EMS, and MMS messages can be achieved without increases the processing and delivery requirements of the MCs 33.

Figures 5, 6:
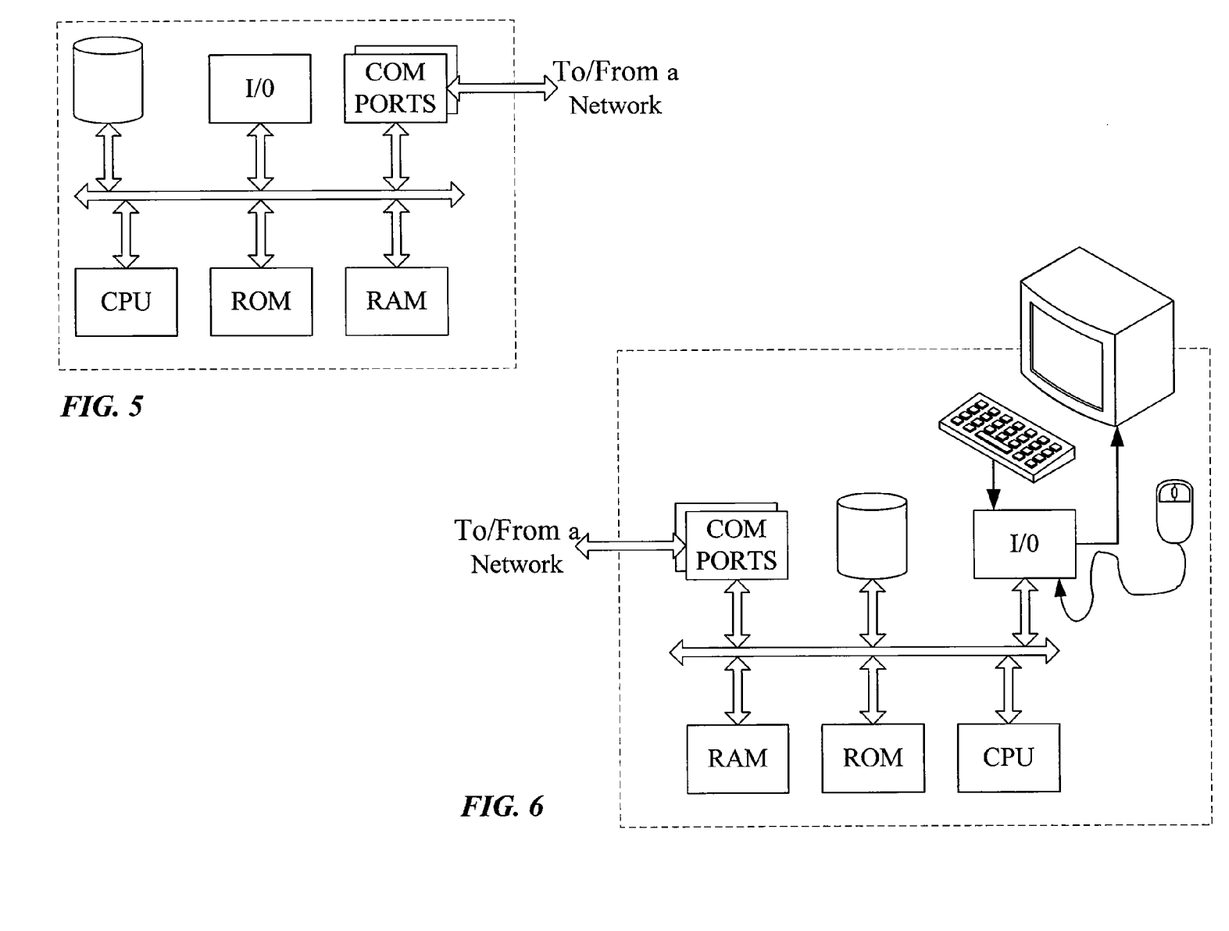
FIG. 5 is a simplified functional block diagram of a computer that may be configured as a host or server.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer (PC) or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of messaging service message forwarding outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, the software can be communicated to the HLR 32 and the MCs 33. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

BMGW: broadband messaging gateway
BS: base station
BTS: base transceiver system
CDMA: code division multiple access
DRT: destination routing table
EV-DO: evolution-data optimized
EMS: enhanced messaging service
GSM: global system for mobile communications
HLR: home location register
HTMP: hypertext mail protocol
HTTP: hyper-text transfer protocol
IMSI: international mobile subscriber identity
IP: internet protocol
IR: infrared
LTE: long term evolution
MC: message center
MDN: mobile directory number
MIN: mobile identification number
MMS: multi-media messaging service
MR: message register
MS: mobile station
MSC: mobile switching center
PDSN: packet data switch node
PC: personal computer
PSTN: public switched telephone network
RAN: radio access network
RF: radio frequency
SIP: session initiation protocol
SMDPP: SMS delivery point-to-point
SMPP: simple messaging service point-to-point
SMS: simple messaging service
SMSC: short message service center
SMSREQ: SMS request
SS7: signaling system 7
STP: signaling transfer points
TCP: transmission control protocol
VLR: visitor location register
WAN: wide area network
WIG: wireless internet gateway
XML: extensible markup language

What is claimed is:

1. A method comprising:
receiving, by a first mobile communications network element, a messaging service message of a messaging service message type being a first messaging service message type or a second messaging service message type different from the first messaging service message type, the messaging service message destined for one of a plurality of mobile stations, different forwarding parameters being set for different mobile stations and different types of messaging service messages;
issuing, by the first mobile communications network element, a first request to a home location register ("HLR") to resolve a location of the one mobile station;
receiving from the HLR, by the first mobile communications network element, a response to the first request, the response not including routing information for the messaging service message, the response including a command to forward the received messaging service message, a forwarding destination associated with the message type of the received messaging service message for the one mobile station and an indication of a second mobile communications network element for resolving a location of the forwarding destination;
issuing, by the first mobile communications network element, a second request to the indicated second mobile communications network element to resolve the location of the forwarding destination, responsive to the command to forward the received messaging service message, such that the location of the forwarding destination is resolved by the second mobile communications network element; and
forwarding the received messaging service message through the mobile communications network to the resolved location of the forwarding destination.

2. The method of claim 1 wherein forwarding the received messaging service message to the resolved location of the forwarding destination comprises forwarding the received messaging service message to another mobile station associated with another mobile communications network.

3. The method of claim 1 further comprising resolving, by a wireless Internet Gateway ("WIG") as the second mobile communications network element, the location of the forwarding destination.

4. The method of claim 1, wherein the forwarding of the received messaging service message comprises forwarding the received messaging service message to different forwarding destinations based on the messaging service message type.

5. The method of claim 4, wherein the first messaging service message type includes a short messaging service ("SMS") message type and the second messaging service message type includes a multimedia messaging service ("MMS") message type, the forwarding of the received messaging service message comprises:
forwarding the received messaging service message according to the forwarding destination which identifies another mobile station when the messaging service message is of the first messaging service message type, and
forwarding the received messaging service message according to the forwarding destination, which identifies, an e-mail address when the messaging service message is of the second messaging service message type.

6. The method of claim 1 further comprising enabling forwarding of the messaging service message during a certain time of day.

7. The method of claim 1 further comprising controlling forwarding of the messaging service message using user-established filtering parameters sent to the first mobile communications network element by the mobile station.

8. The method of claim 1 wherein the command includes a cause code that indicates which second mobile communications network element to issue the request to resolve the location of the forwarding destination.

9. The method of claim 1 further comprising receiving forwarding parameters such that messaging service messages from different originators of the messaging service messages originally destined for a same mobile station are sent to different forwarding destinations based on the originators.

10. The method of claim 1 further comprising receiving forwarding parameters that include temporal limits such that messaging service messages are forwarded for a predetermined amount of time after forwarding has been activated.

11. A mobile communications network, comprising:
a traffic network configured to support communications; and
mobile communications network elements in communication with the traffic network, a first mobile communications network element configured to:
receive a messaging service message of a messaging service message type being a first messaging service message type or a second messaging service message type different from the first messaging service message type, the messaging service message destined for one of a plurality of mobile stations, different forwarding parameters being set for different mobile stations and different types of messaging service messages;
issue a first request to a home location register ("HLR") to resolve a location of the one mobile station;
receive, from the HLR, a response to the first request, the response not including routine information for the messaging service message, the response including a command to forward the received messaging service message, a forwarding destination associated with the message type of the received messaging service message for the one mobile station and an indication of a second mobile communications network element for resolving a location of the forwarding destination;
issue a second request to the indicated second mobile communications network element to resolve the location of the forwarding destination, responsive to the command to forward the received messaging service message, such that the location of the forwarding destination is resolved by the second mobile communications network element; and
wherein the received messaging service message is forwarded through the mobile communications network to the resolved location of the forwarding destination.

12. The mobile communications network of claim 11 wherein the messaging service message is of the first messaging service message type selected from the group consisting of: a short messaging service ("SMS") message type, an enhanced messaging service ("EMS") message type, and a multimedia messaging service ("MMS") message type.

13. The mobile communications network of claim 11 wherein the resolved location of the forwarding destination comprises another mobile station associated with the same mobile communications network.

14. The mobile communications network of claim 11 wherein the resolved location of the forwarding destination comprises another mobile station associated with another mobile communications network.

15. The mobile communications network of claim 11 wherein the resolved location of the first forwarding destination comprises an e-mail address.

16. The mobile communications network of claim 11 wherein the second mobile communications network element comprises a wireless Internet Gateway ("WIG").

17. An article of manufacture comprising:
a non-transitory machine readable storage medium; and
executable program instructions embodied in the machine readable storage medium that when executed by a programmable system coupled to a mobile communications network causes the system to perform functions that forward a messaging service message, including functions to:
receive, by a first mobile communications element, the messaging service message of a messaging service message type being a first messaging service message type or a second messaging service message type different from the first messaging service message type, the messaging service message destined for one of a plurality of mobile stations, different forwarding parameters being set for different mobile stations and different types of messaging service messages;
issue a first request to a home location register ("HLR") to resolve a location of the one mobile station;
receive from the HLR, by the first mobile communications network element, a response to the first request, the response not including routing information for the messaging service message, the response including a command to forward the received messaging service message, a forwarding destination associated with the message type of the received messaging service message for the one mobile station and an indication of a second mobile communications network element for resolving a location of the forwarding destination;
issue a second request to the indicated second mobile communications network element to resolve the location of the forwarding, responsive to the command to forward the received messaging service message, such that the location of the forwarding destination is resolved by the second mobile communications network element; and
forward the received messaging service message through the mobile communications network to the resolved location of the forwarding destination.

18. The article of manufacture of claim 17 wherein the messaging service message is of the first messaging service message type selected from the group consisting of: a short messaging service ("SMS") message type, an enhanced messaging service ("EMS") message type, and a multimedia messaging service ("MMS") message type.

19. The article of manufacture of claim 17 wherein the function of forwarding to the resolved location of the forwarding destination comprises the function to forward the received messaging service message to another mobile station associated with the same mobile communications network.

20. The article of manufacture of claim 17 wherein the function of forwarding to the resolved location of the forwarding destination comprises the function to forward the received messaging service message to another mobile station associated with another mobile communications network.

21. The article of manufacture of claim 17 wherein the function of forwarding to the resolved location of the forwarding destination comprises the function to forward the received messaging service message to an e-mail address.

22. The article of manufacture of claim 17 wherein the function of issuing the second request to the second mobile communications network element comprises the function to issue the second request to a wireless Internet Gateway ("WIG").

23. The article of manufacture of claim 17 further comprising the function to resolve, by a wireless Internet Gateway ("WIG"), the location of the forwarding destination.

* * * * *